United States Patent [19]
Akins et al.

[11] Patent Number: 5,735,329
[45] Date of Patent: Apr. 7, 1998

[54] CONNECTOR FOR PULL CORDS

[75] Inventors: Terry L. Akins, Louisville; Joseph E. Kovach, Thornton, both of Colo.

[73] Assignee: Hunter Douglas Inc., Upper Saddle River, N.J.

[21] Appl. No.: 787,085

[22] Filed: Jan. 22, 1997

Related U.S. Application Data

[63] Continuation of Ser. No. 469,455, Jun. 6, 1995, abandoned.

[51] Int. Cl.$^6$ ............................................. E06B 9/30
[52] U.S. Cl. ...................... 160/178.1 R; 160/178.2 R; 160/168.1 R; 160/173 R; 160/320; 24/115 M; 16/206
[58] Field of Search ................ 160/168.1, 173, 160/178.1 R, 178.2 R, 320; 24/115 M, 115 J, 114.5, 136 R, 712.9; 16/208, 206

[56] References Cited

U.S. PATENT DOCUMENTS

| | | |
|---|---|---|
| 914,768 | 3/1909 | Walker et al. . |
| 1,327,591 | 1/1920 | Charles . |
| 2,220,203 | 11/1940 | Branin . |
| 4,271,893 | 6/1981 | McCluskey . |
| 4,718,788 | 1/1988 | Briscoe . |
| 4,967,824 | 11/1990 | Colson et al. . |
| 5,058,650 | 10/1991 | Morris . |
| 5,279,473 | 1/1994 | Rozon .................... 160/178.1 R X |
| 5,542,461 | 8/1996 | Huang .................... 160/178.1 R |
| 5,562,140 | 10/1996 | Biba .................... 160/178.1 R |

FOREIGN PATENT DOCUMENTS

| | | |
|---|---|---|
| 0281279A1 | 9/1988 | European Pat. Off. . |
| 2706523 | 12/1994 | France . |
| 64-2953 | 1/1989 | Japan . |
| 1-24318 | 7/1989 | Japan . |
| 8301108 | 3/1984 | Netherlands . |
| 976220 | 11/1964 | United Kingdom . |

Primary Examiner—Harry C. Kim
Assistant Examiner—Bruce A. Lev
Attorney, Agent, or Firm—Dorsey & Whitney LLP

[57] ABSTRACT

A connector for connecting a plurality of pull cords to a knob or tassel. A wedge cleat releasably engages the pull cords and releasably connects the same to a tassel. A surplus cord core integral with and depending from the cleat receives and retains surplus cord wound thereon. A tassel plate integral with the core mounts a tasseled manipulating cord. A decorative and protective cover encloses the wedge cleat, surplus cord core and cord, and tassel plate.

4 Claims, 3 Drawing Sheets

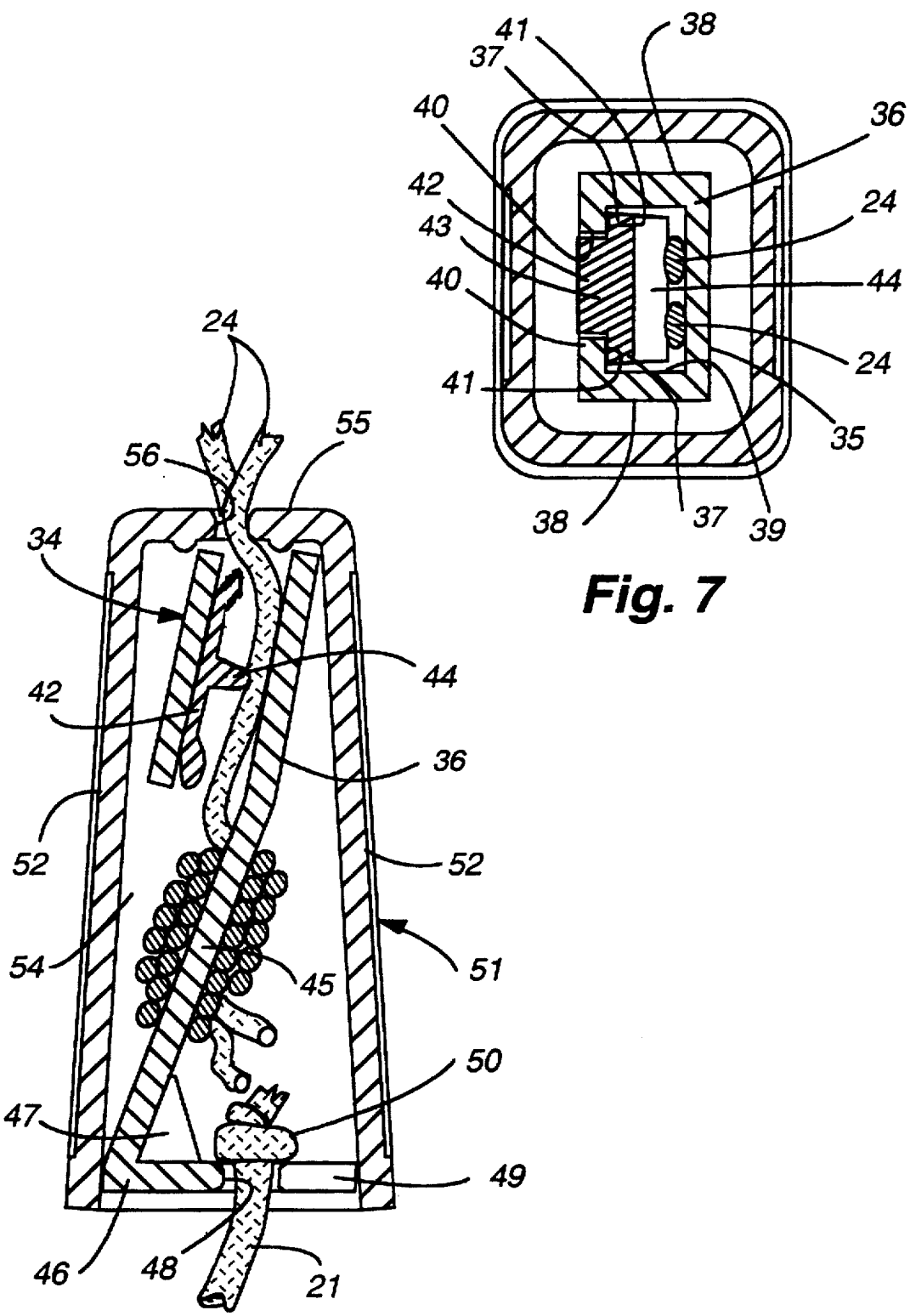

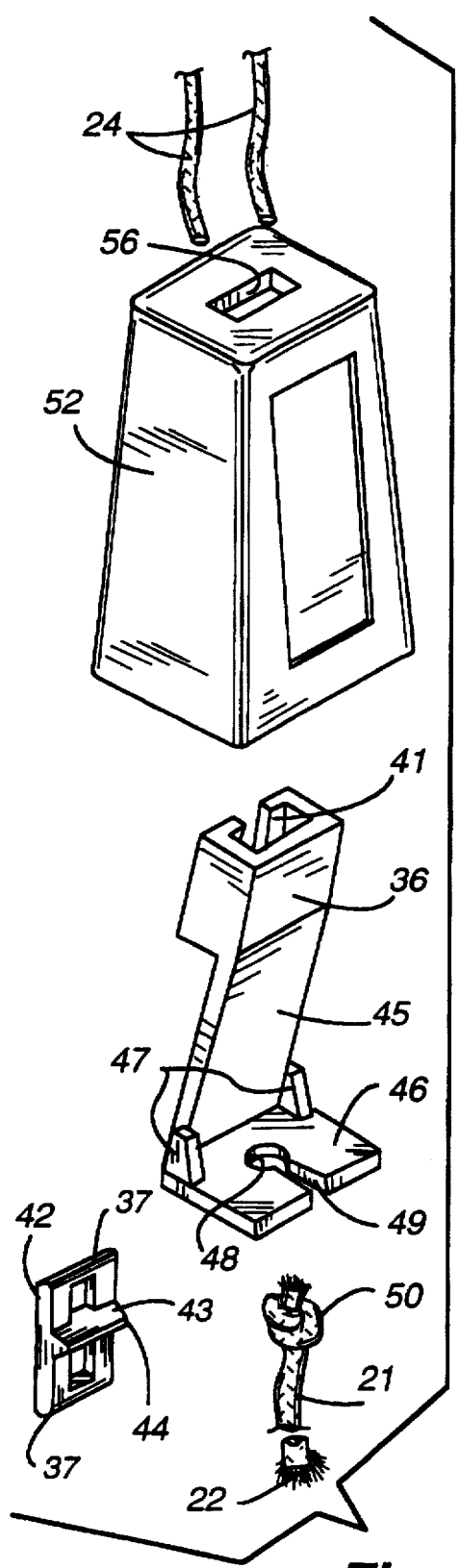
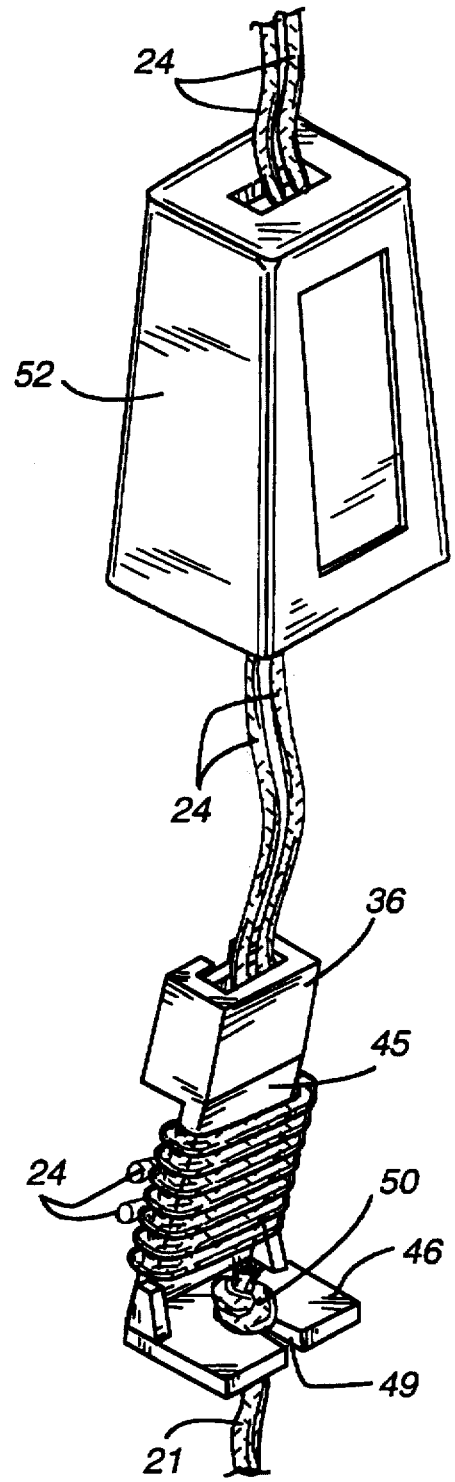
Fig. 9
Fig. 8 ize: 5,735,329

CONNECTOR FOR PULL CORDS

CROSS-REFERENCE TO RELATED APPLICATION

This application is a continuation of U.S. application Ser. No. 08/469,455 filed Jun. 6, 1995, now abandoned.

BACKGROUND OF THE INVENTION

1. Field of the Invention

The present invention relates to connectors for pull cords and more particularly to equalizing connectors for attaching tassels or knobs to pull cords.

2. Brief Description of the Prior Art

A cord tension equalizing connector and ball safety stop, with a tassel or knob attached directly on the lower ends of cords for raising and lowering a covering for an architectural opening, is shown in U.S. Pat. No. 4,967,824. A connector for attaching a tassel cord to a plurality of pull cords is shown in GB Pat. 976,220. An equalizing connector for a plurality of pull cords, which connector also serves as a ball stop, is shown in U.S. Pat. No. 5,058,650. A connector for attaching a plurality of cords to a single pull cord is shown in published European Patent Application No. EP 0 281 279.

OBJECTS OF THE INVENTION

It is the principal object of the present invention to provide an improved connector between a plurality of pull cords, such as pull cords for a window blind, and a manipulating cord with a tassel or knob.

Another object of the present invention is to provide an improved connector of the foregoing character which can be adjusted to lengthen or shorten the connection point on the pull cords.

A further object of the present invention is to provide a connector of the foregoing character which is simple and easy to use and provides for substantial adjustability of the length of the pull cords relative to the blind actuating mechanism.

Still a further object of the present invention is to provide a connector of the foregoing character which is decorative and adaptable to a variety of manipulatable tassels or knobs.

Other objects and advantages of the present invention will become apparent from the following description and accompanying drawings.

SUMMARY OF THE INVENTION

In accordance with the foregoing objects, the present invention is embodied in a connector for connecting a plurality of pull cords to a knob or tassel. A wedge cleat releasably engages the pull cords and both equalizes the tension thereon to provide for level adjustment of the shade and releasably connects the same to a manipulating cord having a tassel or knob thereon. A surplus cord core is integrally formed on and depends from the cleat. Surplus cord is wound on the cord core for storage. A tassel plate integrally formed on the end of the core receives a knotted end of a tasseled or knobbed manipulating cord. A decorative and protective cover encloses the wedge cleat, surplus cord core and cord wound thereon, and tassel plate.

The structure embodying the present invention provides an advantageous feature in that the lengths or tension of the cords can be equalized, the extension of the shade may be controlled, and excess cord can be preserved for subsequent adjustments, while providing an aesthetic appearance to the pull cord.

DESCRIPTION OF THE DRAWINGS

FIG. 6 is a section view taken substantially in the plane of line 6—6 on FIG. 3.

FIG. 7 is a section view taken substantially in the plane of line 7—7 on FIG. 3.

FIG. 8 is a perspective view of a partially disassembled connector of the character shown in FIG. 2.

FIG. 9 is an exploded, perspective view of the connector shown in FIG. 8.

DESCRIPTION OF THE PREFERRED EMBODIMENT

Figure 1:
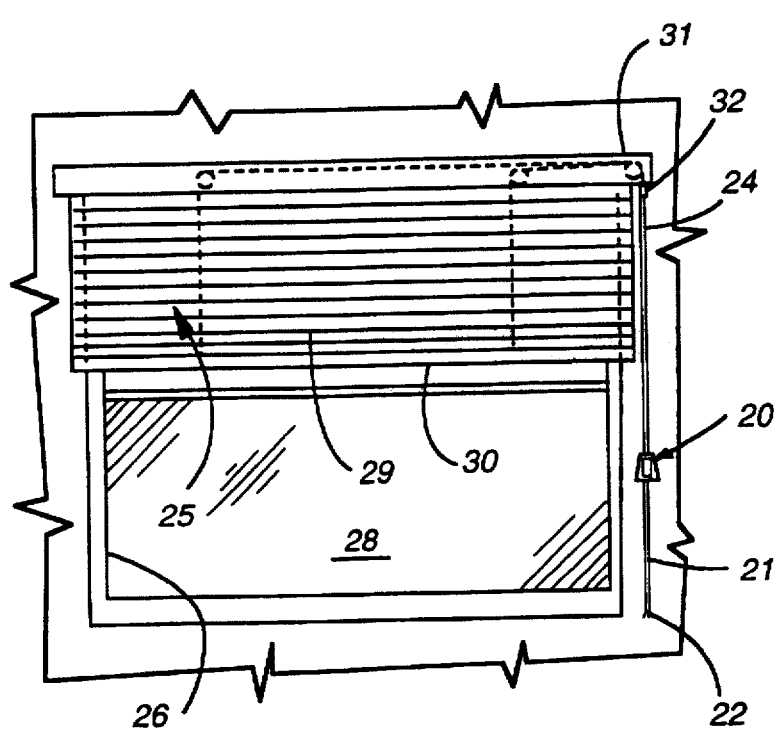
FIG. 1 is an elevation view of an architectural opening and window with a window covering blind, pull cord and connector embodying the present invention.
Figure 2:
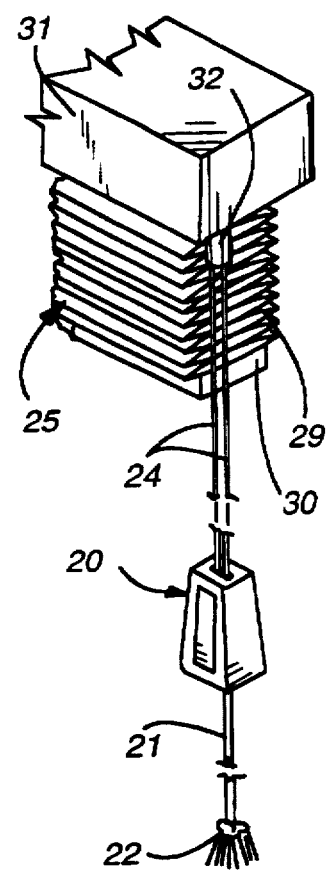
FIG. 2 is an enlarged perspective view of a portion of the window blind and connector embodying the present invention with a tassel cord and tassel depending therefrom.
Figure 3:
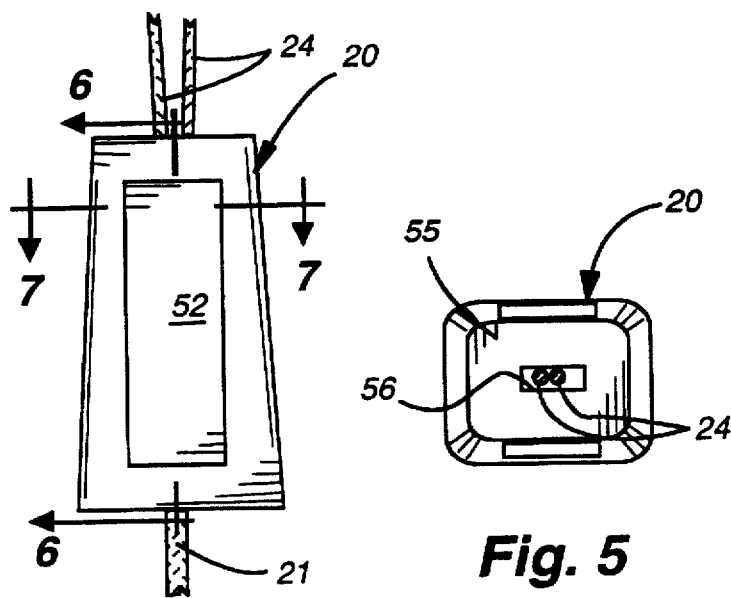
FIG. 3 is a front elevation view of the connector shown in FIGS. 1 and 2.
Figure 5:
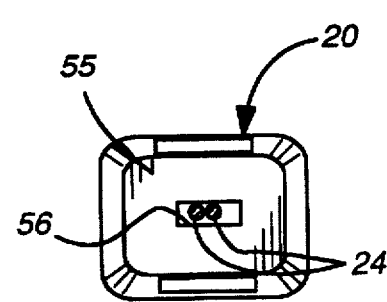
FIG. 5 is a top view of the connector shown in FIG. 3.
Figure 4:
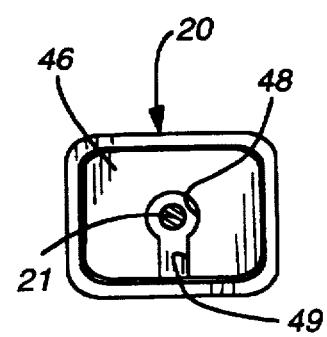
FIG. 4 is a bottom view of the connector shown in FIG. 3.

The present invention is embodied in a connector 20 for attaching a manipulatable cord 21 with a tassel or knob 22 on the lower end thereof to a plurality of pull cords 24 to facilitate raising and lowering of a blind or covering 25 for an architectural opening 26 such as a window 28. The window covering 25 is formed by an expandable and contractable panel 29 secured along its lower edge to a bottom rail 30 and at its upper edge to a head rail 31. The covering 25 is mounted in the window or other architectural opening 26 or is utilized in any other application or structure requiring raising or lowering of an expandable panel by use of a plurality of pull cords. The pull cords are trained through a latch mechanism 32 on the head rail 35 and thence through the head rail over pulleys or guides and downwardly through the expandable and contractable panel 29 to secured engagement with the bottom rail 30, as shown in FIG. 1. The latch mechanism 32 releasably engages the cords thereby to hold the window covering panel 25 in the desired expanded or contracted position.

The connector 20 engages and retains the plurality of cords 24 and attaches them to a depending manipulating cord 21 having a tassel or knob 22 at its lowermost end. To this end the connector 20 includes a wedge cleat 34 adapted to engage and retain the pull cords 24. The wedge cleat 34 includes a body 35 and a slide 42. The body 35 has a base plate 36 with spaced side walls 38 defining a channel 39 therebetween. Each side wall terminates at its outer edge in an inturned longitudinally tapered flange 40, each flange defining an inner sloping wedge surface 41.

For gripping the pull cords 24, the slide 42 has a projecting cleat rib 44 and is slidably received in the channel 39. The slide 42 defines spaced shoulders 37 which wedgingly engage the wedge surfaces 41 of the inturned flanges 40 on the cleat body 35. The wedging action between the slide and the body grips the pull cords 24 between the cleat rib 44 and the channel base 36. This gripping action increases with a tension or pulling force on the cleat and the pull cords in a downward direction, and can be released by pulling upwardly on the cleat while holding the surplus ends of the cords.

For storing surplus cord, a core plate, block or member 45, sometimes referred to as a block member is integrally formed as a longitudinal axial extension from the cleat body 35. The plate 45 extends downwardly from the cleat body 35 and defines a web or core about which surplus cord is wound and stored.

In order to secure a manipulating cord with a tassel or knob to the cleat, an inturned flange or tassel plate 46 is integrally formed at the lower end of the core plate or cord storage slat 45. A strengthening fillet or rib 47 may be formed integrally with the plate 45 and tassel plate 46. The tassel plate 46 defines a keyhole slot 48 and aperture 49 for receiving and retaining a knotted end 50 of the manipulating tassel cord 21. Alternatively, an aperture and slot may be formed in the depending portion of the cord core for receiving a tassel cord. Further, the slot may be omitted and a tassel cord aperture may be utilized which is of a diameter sufficient to receive the tassel cord but small enough to block a knot in the cord.

For housing the cord wedge cleat and wound surplus cord, a cap or cover 51 is positioned over the cleat surplus cord core and tassel plate. The cap or cover 51 is formed with downwardly and outwardly sloping side walls 52, end walls 54, and an upper end plate 55 defining an aperture 56 for receiving the cords 24. The cap is preferably trapezoidal or truncated conical in shape. The tassel plate desirably forms the bottom plate or end closure on the cover or cap, and the exterior surface of the cover or cap may be appropriately decorative.

For stopping the retraction of the cords 24 to prevent the blind or expanding panel from crashing against a bottom surface, the cleat may be secured to the pull cords 24 at a point such that the cover or cap 51 contacts the latch mechanism 32 before the window covering panel 29 is fully extended, thereby providing an appropriate safety stop. The cleat further enables the cord lengths to be equalized so that the shade remains level.

While a certain illustrative embodiment of the present invention has been shown in the drawings and described above in detail, it should be understood that there is no intention to limit the invention to the specific form disclosed. On the contrary, the intention is to cover all modifications, alternative constructions, equivalents and uses falling within the spirit and scope of the invention as expressed in the appended claims.

We claim:

1. A connector, pull cord and manipulating cord combination, said connector being adapted for connecting two or more pull cords, said connector comprising a wedge cleat including a cleat body and a moveable slide to releasably connect said pull cords to said connector, a block member integral with said cleat body around which said pull cord can be wound, a tassel plate integral with said cleat body, a releasable manipulating cord mounted on said tassel plate, and a cover positioned over the cleat body.

2. A connector and pull cord assembly for a window covering, comprising in combination, a plurality of pull cords and a connector adapted for releasably connecting said plurality of pull cords, said connector comprising a wedge cleat having a longitudinal axis releasably engaging and gripping said pull cords for connecting the same together, a fixed rigid core member integral with and extending axially from said wedge cleat for windably storing thereon excess lengths of said pull cords extending from said wedge cleat and a cover enclosing at least said fixed rigid core member.

3. A connector and pull cord assembly for a window covering, comprising in combination, a plurality of pull cords and a connector adapted for releasably connecting a plurality of said pull cords together, said connector comprising a wedge cleat having a longitudinal axis releasably engaging and gripping said pull cords for connecting the same together, a fixed rigid core member integral with and extending axially from said wedge cleat for windably storing thereon excess lengths of said pull cords extending from said wedge cleat, a tassel plate integral with said core member, a tasseled manipulating cord secured to said tassel plate and a cover enclosing at least said fixed rigid core member.

4. A connector and pull cord assembly for a window covering, comprising in combination, a plurality of pull cords and a connector adapted for releasably connecting a plurality of said pull cords together, said connector comprising a wedge cleat having a longitudinal axis releasably engaging and gripping said pull cords for connecting the same together, a fixed rigid core member integral with and extending axially from said wedge cleat for windably storing thereon excess lengths of said pull cords, a tassel plate integral with said core member, a tasseled manipulating cord secured to said tassel plate, and a cover enclosing said wedge cleat, said core member with said cords wound thereon, and said tassel plate.

* * * * *

UNITED STATES PATENT AND TRADEMARK OFFICE
CERTIFICATE OF CORRECTION

PATENT NO. : 5,735,329
DATED : Apr. 7, 1998
INVENTOR(S) : Akins et al.

It is certified that error appears in the above-identified patent and that said Letters Patent is hereby corrected as shown below:

Title page [56]

| References Cited— U.S. patent documents | | | |
|---|---|---|---|
| 3,633,646 | 01/1972 | Zilver | 160/178.2Rx |
| 4,628,630 | 12/1986 | Bohme | 24/115Mx |
| 5,193,252 | 03/1993 | Svehaug | 24/136Rx |
| 5,472,035 | 12/1995 | Biba et al. | 160/168.1R |
| 5,473,797 | 12/1995 | Wu | 160/178.2x |

Signed and Sealed this

Twenty-ninth Day of September, 1998

*Attest:*

BRUCE LEHMAN

*Attesting Officer*          *Commissioner of Patents and Trademarks*